May 30, 1972 R. E. ULM ET AL 3,666,381
SUBMERSIBLE FUEL PUMP
Filed May 20, 1970 2 Sheets-Sheet 1

INVENTORS
RALPH E. ULM
CLAUDE F. PHILLIPS
MICHAEL J. SULLIVAN
LARRY C. COLLINS
WILLIAM RUSSELL PARRENT

ATTORNEY

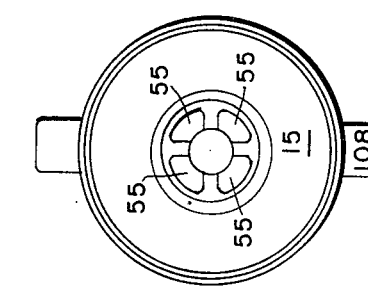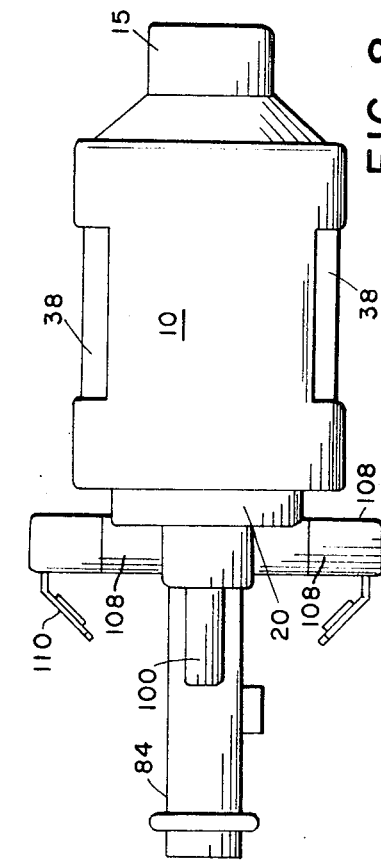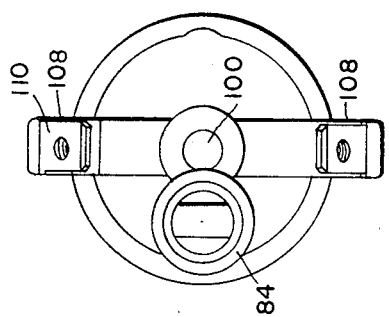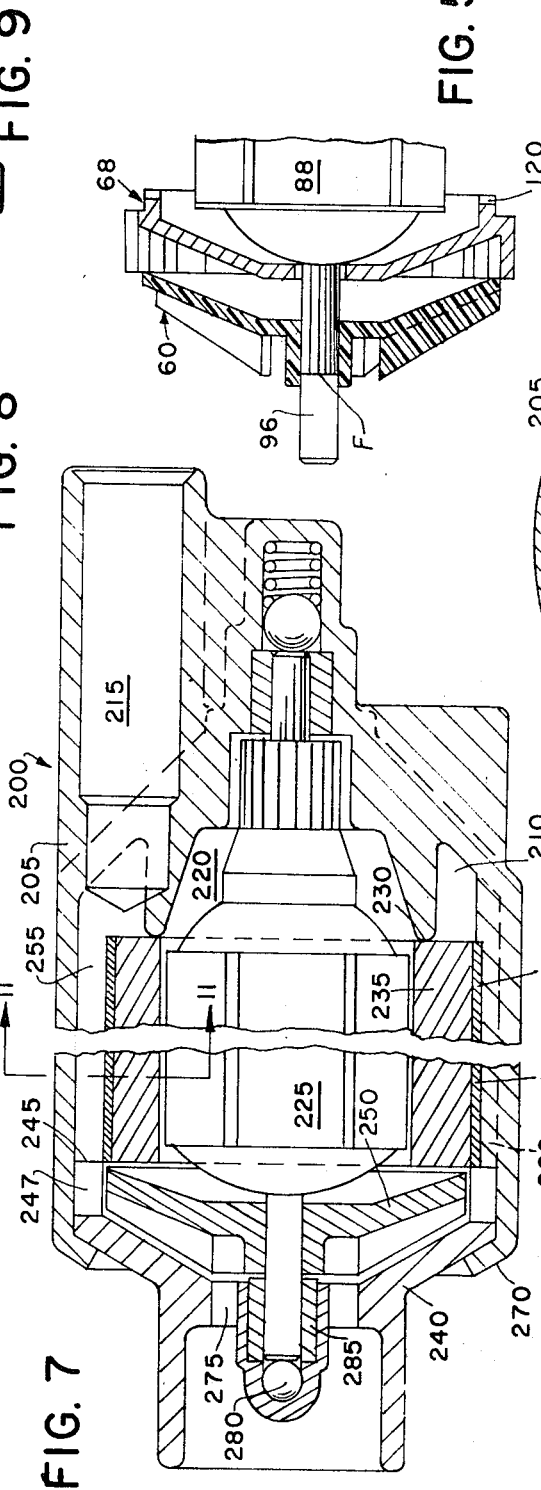

United States Patent Office 3,666,381
Patented May 30, 1972

3,666,381
SUBMERSIBLE FUEL PUMP
Ralph E. Ulm, Claude F. Phillips, Michael J. Sullivan, Larry C. Collins, and William Russell Parrent, Fairfield, Ill., assignors to Airtex Products, Division of United Industrial Syndicate, New York, N.Y.
Filed May 20, 1970, Ser. No. 37,951
Int. Cl. F04b 17/00, 35/04
U.S. Cl. 417—423
16 Claims

ABSTRACT OF THE DISCLOSURE

A rotary electric fuel pump using a permanent magnet motor is constructed of parts having a simple geometric pattern for mass production by sheet metal stamping and plastic molding. The construction provides for housing a cylindrical magnet stator for a motor field and a high-speed armature. The fuel medium being pumped flows over the magnet effecting cooling, with some diverting of flow through the armature for cooling. A further feature resides in the construction of an impeller having flow passage to the stator slots phased in such a manner that peak flow pressure at the slots is evened out around the impeller. Thus, the impeller vane spacing is related to that of the stator slots other only one flow pressure peak occurs at a time, and such peaks occur sequentially at wide spaced points around the rotary axis. This minimizes electric current peaks and brush sparking as well as bearing wear. The construction is fully sealed for submerged use in fuel tanks.

---

Briefly, the invention in a preferred form comprises a steel housing or shell of generally cylindrical shape but formed with radial depressions. A cylindrical ceramic magnet of known type is used as a D.C. motor field carried within the shell and an armature rotates within the magnet. Current to the armature is brought in via a commutator and radially disposed brushes. The construction permits of inlet and outlet body members formed of molded plastic locked within the steel housing and providing bearing support for the armature, as well as support for the brushes. The cylindrical magnet is radially supported by the sleeve depressions, radially spaced within the sleeve, and longitudinally locked by the body members in conjunction with an intermediate pump stator. A complete flux trap, or substantially so, is provided for the magnet by the sleeve whereby all fluix is confined within the sleeve and only minimum stray magnetic leakage may occur.

A centrifugal pump impeller of molded plastic is keyed to the armature shaft, being of conical shape having equally spaced radial vanes, the periphery of which is surrounded by a collar formed of the pump stator. The stator collar is slotted to take flow radially outward of the vanes and direct it longitudinally through the radial spacing between the outer sleeve and magnet.

The flow passes longitudinally over the outer surface of the cylindrical magnet to an annular outlet channel which connects to an outlet conduit integrally molded with the outlet body member.

The stator slots are numerically unequal to the impeller vanes and at such ratio numerically thereto that although equiangularly spaced, the output flow from the vanes through the slots occurs in a predetermined time order of flow peaks so that flow through each slot has a discharge peak to the output channel at a specific time in each rotation of the impeller. Accordingly, flow pulsation at maximum pressure occurring simultaneously from a plurality of slots is avoided and thus the pump operates with a minimum of shock and vibration.

The timed pressure pulsations are spaced to apply the torque load through equally spaced increments, reducing the magnitude of the peak to peak electric current pulses of the electric motor driving the impeller and reducing sparking of the brushes. Also, due to the angular spacing of the impeller passage means in respect to the stator passage means, the relative orientation around the impeller shaft of radial reaction forces at peak pressures is widely distributed which minimizes bearing wear.

A detailed description of the invention now follows in conjunction with the appended drawing in which:

FIG. 5 is an exploded section of an impeller and stator in partial assembly;

FIG. 7 is an exterior view of one end of the pump;

FIG. 8 is a longitudinal exterior view;

FIG. 9 is an exterior view of the other end of the pump;

FIG. 10 is a longitudinal section of a modified pump and construction;

FIG. 11 is a fragmentary radial section through 11—11 of FIG. 10.

Figure 1:
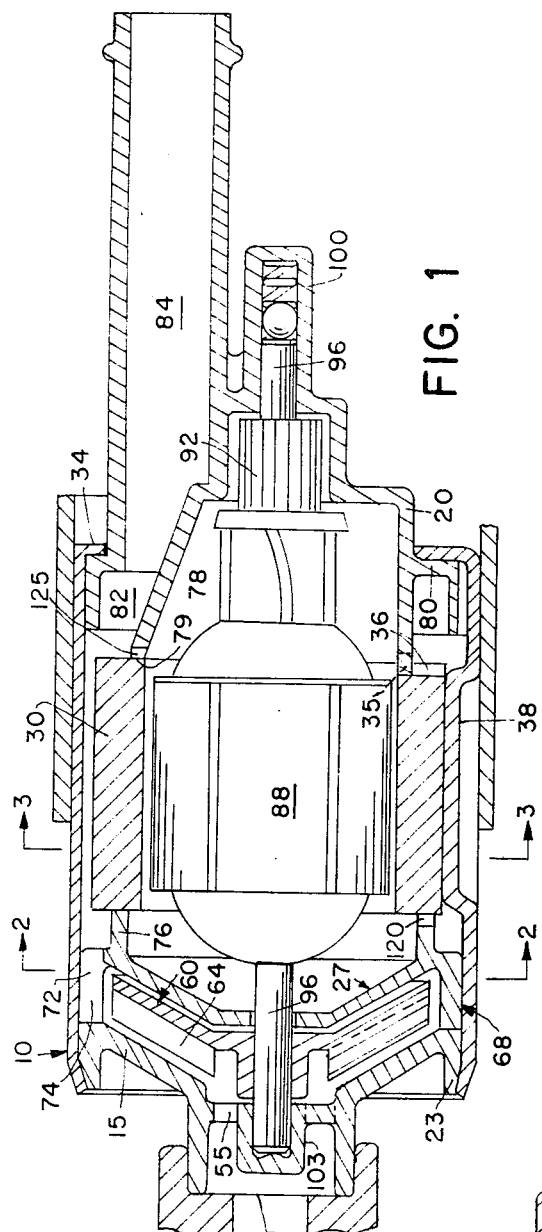
FIG. 1 is a section through a preferred form of the invention taken longitudinally.

Referring to FIGS. 1 thru 9, the preferred form of the invention comprises a generally cylindrical steel sleeve or shell 10 closed at both ends by body member means such as the plastic body member 15 at the inlet end and plastic body member 20 at the outlet end. The inlet end of the shell is radially deformed to fit tightly and sealingly against a conical shoulder 23 of a molded plastic body member 15 which abuts a pump stator 27, the stator in turn abutting a ceramic magnet 30 of cylindrical shape. The other end of the magnet is abutted by molded plastic body member 20 in turn sealingly locked within sleeve 10 by the inwardly directive radial flange 34. Accordingly, magnet 30 is longitudinally locked in the shell 10 by the body members and prevented from rotating by a tongue 35 of body member 20 protruding into a notch 36 of the magnet.

Figure 3:
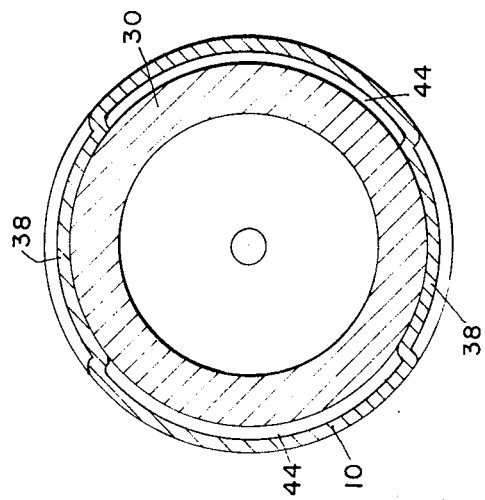
FIG. 3 is a section through 3—3 of FIG. 1, omitting the armature.

Shell 10 is provided with arcuate depressions 38, a pair of such depressions being diametrically opposed as seen in FIG. 3, forming protuberances, and the magnet 30 is radially disposed and located concentrically within shell 10 by being contiguous within the inner surfaces or walls of the depressions 38. Accordingly, the construction thus far described locks magnet 30 radially and longitudinally and affords large arcuate flow spacing such as recesses 44 intermediate the depressions 38 which recesses or passages extend longitudinally over magnet 30.

Inlet body member 15 has an entrance collar 47 around which is seated a filter tube 50 (fragmentarily shown) which tube is understood to be made of any suitable filter material. When the pump is submerged in a fuel tank, fuel can pass thru the filter tube into collar 47 and inlet ports 55 to the hub of an impeller 60, there being three inlet ports such ports 55 as noted on FIG. 9.

Figure 2:
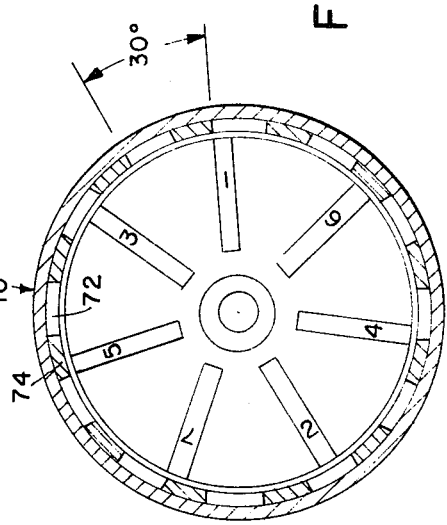
FIG. 2 is a radial section through 2—2 of FIG. 1 showing the impeller and stator relationship.

A molded plastic impeller 60 of conical form is provided having a plurality of vanes 64 equiangularly disposed and conically slanted as shown, being disposed in radial planes. As seen in FIG. 2, the specific embodiment being described has seven such vanes peripherally surrounded by a collar 68 of stator 27 which collar is essentially cylindrical but provided with twelve equiangular disposed slots 72 separated by fingers 74. The slots provide longitudinally flow passages for centrifugal flow induced by the impeller and directs such flow to the recesses 44. It will be understood that collar 68 is thus longitudinally open at the beginning and end of each slot 72 and that fingers 74 of the collar abut at their upstream ends with body member 15.

The stator 27 has a downstream collar 76 extending into engagement with magnet 30. Accordingly, as heretofore mentioned, the stator is an abutment member between body member 15 and magnet 30 at the upstream end of the magnet. At the downstream end of the magnet, body member 20 is formed with a continuous wall 78 effecting a radial edge 79 abutting the magnet. Body member 20 is also suitably formed with a radial flange 80 which seats against shell flange 34 and the molding which forms body member 20 is provided with an internal annular outlet channel 82 circumferentially surrounding wall 78 and from which channel extends an outlet conduit 84 all integrally molded therewith. Any suitable tubing can be connected to conduit 84 for fuel discharge from the pump leading out of the fuel tank to an engine carburetor, in a well understood manner.

Referring to the foregoing it will be understood that ingress of fuel via filter 50 can be centrifugally pumped by rotation of impeller 60 whence fuel discharge is directed through slots 72 of stator 27 longitudinally to recesses 44, over most of the exterior areas of magnet 30 and thence to outlet channel 82 and conduit 84.

It will be appreciated that the radial spacing between the magnet and shell 10 although not completely about the periphery of the magnet is sufficient to permit flow without undue restriction.

Rotation of the impeller is effected by an armature 88 of a D.C. permanent magnet motor, the magnet 30 being the flux field therefore. The armature has a commutator 92 and a shaft 96 extending thru the construction, in a conventional manner, and to which the impeller is keyed, wherein one end of the shaft has suitable bearing in body member 15 and the other end has similar bearing in body member 20. The bearing surfaces are, of course, coaxial with the shaft and are provided by the hubs 100 and 103 molded into the respective body members as shown. In the case of the downstream end of the shaft 96, the hub 100 is elongated for purposes of accommodating a ball and spring whereby the ball is pressed against the respective shaft end to bias the armature into a predetermined position wherein the other end of the shaft has its end abutting the closed end of hub 103.

Figure 6:
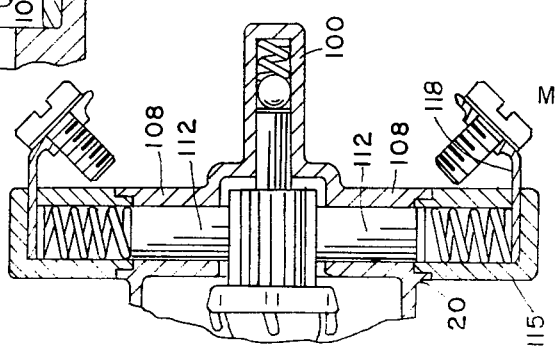
FIG. 6 is a detail shown fragmentarily of the commutator brush construction in partial cross section, taken at right angles to FIG. 1.

As seen in FIG. 6 a radial brush arrangement is preferred and suitable bosses 108 are integrally molded with the body member 20 to accommodate commutator brushes 112 spring biased and retained by caps 115 which secure connection terminals 118 all in a conventional manner wherein the caps may be welded to the body member 20, as shown.

In order to provide for internal cooling of the motor a small passageway 120 is slotted through collar 76 whence flow from the stator can to any desired extent be diverted into the armature region to flow through the armature within the housing therefore provided by the body members and the magnet, such flow having egress via a slot 125 at edge 79 in body member 20 into outlet conduit 84. Thus any desired amount of cooling flow would be provided which flow is continuous for cooling the armature, whereas general cooling of the motor is afforded by the longitudinal flow over the magnet. The magnet is thus kept cool while absorbing heat from fuel passing through the armature chamber thereby augmenting the cooling effect on the armature.

An important feature of the invention resides in the fact that the numerical ratio of impeller vanes to stator slots is such as to permit phasing of vane progression passing the slots in a timed order so that flow peaks occur in a predetermined sequence and never simultaneously from any two slots. Thus, as seen in FIG. 2 the progression of flow peaks will be in accordance with numerals 1–7 noted on the vanes, the direction of rotation of the impeller being counterclockwise as indicated by the arrow. By providing 7 vanes and 12 slots there are 12 flow peaks per rotation of the impeller occurring in the numerical order 1–2–3–4–5–6–7, shown on FIG. 2. It will be noted that flow peaks occurring through the slots are separated as to respective slots by a wide angle. This geometrically distributes the flow peaks about the periphery of the stator to minimize reactive forces. In other words, peak flow caused by vane 1 is followed by peak flow caused by vane 2 and then peak flow caused vane 3, etc., all such peak flows being timed so as to occur at widely separated points around the stator, wherein the timing is effected by a suitably selected ratio of the number of impeller vanes to the number of stator slots 72. In this instance seven vanes and twelve slots are shown but it will be apparent that other ratios are usable for peak flow distribution effect.

Figure 4:
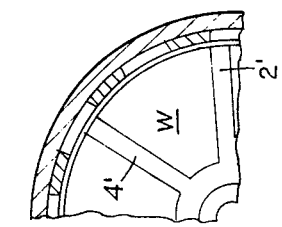
FIG. 4 is a radial fragmentary section of modified construction of the impeller.

Referring to FIG. 4, a modification of the impeller is shown wherein grooves 2′ and 4′ are molded between raised wedges such as W. The grooves perform the function of the vanes of FIG. 2 and merely represent an alternate form of an injection molded impeller. The stator would be the same as heretofore described.

Referring now to FIG. 5, a detail of assembly is shown in an exploded view to illustrate the keying ribs, knurls, or flutes F milled or pressed into armature shaft 96 with impeller 60 being shown partially forced thereon so as to be keyed thereto, whereby a complete sub-assembly comprises the armature, the stator and impeller.

Referring to FIGS. 10 and 11 a modification using essentially all molded plastic components is illustrated wherein the body member means comprises an integral molding 200 having the cylindrical shell portion 205, the outlet annular channel 210 and outlet conduit 215. The molding has cavity 220 forming a part of the housing for the armature 225 and terminating in a lip or edge 230 which abuts the cylindrical field magnet 235. A second molded body member 240 is formed so as to effect the stator for the pump by providing the longitudinal slots 245 with spaced fingers 247, surrounding the periphery of impeller 250. The slots communicate with arcuate grooves 255 molded into the wall of shell portion 205 (FIG. 11) and which grooves are recesses corresponding to the longitudinal flow passages 44 of FIG. 3. However, any number of such grooves 255 may be provided. The lands 260 between grooves support the magnet 235 with an intermediate steel ring 265 fitting tightly over the magnet and force fitted against the inner surfaces of the lands. Accordingly, the magnet is radially located by the lands but secured longitudinally by press fitting with longitudinal location being determined by the peripheral edge 230. The impeller may have seven vanes and the stator twelve slots as in FIG. 2.

The body member 240, which integrally combines the stator is longitudinally locked by virtue of the ends of the stator fingers 247 abutting the ends of various lands 260 and by the deformation radially of the end of housing portion 205, as by heat and pressure, into sealing engagement at 270 with the conically shaped flange of body member 240.

The body member is provided with the inlet ports 275 and accordingly it will be apparent that flow takes place through the pump in essentially the same manner as heretofore described for FIG. 1, i.e., from ports 275 to the impeller and thence to stator slots 245, grooves 255, annular channel 210 and outlet conduit 215.

The armature is mounted in a manner similar to that heretofore described, having shaft ends with bearing rotation in respective body members and spring pressed ball bias in body member 200. However, the other body member may likewise be provided with a ball 280 as an antifriction bearing. Metallic bushings such as 285 may be used for bearing support within the body members, if desired.

We claim:

1. A rotary electric pump comprising a shell, said shell having a plurality of protuberance means extending thereinto and a magnet within said shell radially supported therein by said protuberance means spaced from walls of said shell to provide for flow passage in the spacing thus provided for fuel flow between said shell and said magnet, body means in said shell at opposed ends of said magnet operative to locate said magnet axially within said shell and said body means being secured within said shell; said body means having port means affording fuel ingress at one end of said shell and fuel egress at the other end of said shell; and pump means having an impeller within said shell at said fuel ingress end; an electric motor armature within said magnet drivingly connected to said impeller for rotation thereof; said pump means having flow guidance means encompassing the periphery of said impeller for directing flow through said spacing from said impeller and over said magnet to said egress end port means.

2. In a rotary electric pump as set forth in claim 1, said shell being comprised of magnetic metal.

3. In a rotary electric pump as set forth in claim 1, said flow guidance means comprising a stator encompassing said impeller and having a slotted periphery effecting flow guidance slots for fuel flow to said spacing from said impeller.

4. A rotary electric pump as set forth in claim 1, wherein the fuel egress means comprises a member having a continuous annular channel disposed for receiving flow from said spacing and said port means for fuel egress communicating with said channel.

5. In a rotary electric pump as set forth in claim 1, said shell being comprised of magnetic metal, said flow guidance means comprising a stator encompassing said impeller and having a slotted periphery effecting flow guidance slots for fuel flow to said spacing from said impeller.

6. In a rotary electric pump as set forth in claim 1, said flow guidance means comprising a stator encompassing said impeller and having a slotted periphery effecting flow guidance slots for fuel flow to said spacing from said impeller, wherein the fuel egress means comprises a member having a continuous annular channel disposed for receiving flow from said spacing and said egress port means for fuel egress communicating with said channel.

7. In a rotary electric pump as set forth in claim 1, said shell being comprised of magnetic metal, said flow guidance means comprising a stator encompassing said impeller and having a slotted periphery effecting flow guidance slots for fuel flow to said spacing from said impeller, wherein the fuel egress means comprises a member having a continuous annular channel disposed for receiving flow from said spacing and said port means for fuel egress communicating with said channel.

8. In a rotary electric pump as set forth in claim 1, said shell being comprised of magnetic metal, wherein the fuel egress means comprises a member having a continuous annular channel disposed for receiving flow from said spacing and said port means for fuel egress communicating with said channel.

9. In a rotary electric pump as set forth in claim 1, said body means at said ingress and comprising a disc-like member having an open central hub effecting said ingress port means and communicating with said impeller centrally thereof.

10. In a rotary electric pump as set forth in claim 1, said flow guidance means comprising a stator encompassing said impeller and having a slotted periphery effecting flow guidance slots for fuel flow to said spacing from said impeller, said body means at said ingress and comprising a disc-like member having an open central hub effecting said ingress port means and communicating with said impeller centrally thereof.

11. In a rotary electric pump as set forth in claim 1, said shell being comprised of magnetic metal, said flow guidance means comprising a stator encompassing said impeller and having a slotted periphery effecting flow guidance slots for fuel flow to said spacing from said impeller, said body means at said ingress end comprising a disc-like member having an open central hub effecting said port means and communicating with said impeller centrally thereof.

12. In a rotary electric pump as set forth in claim 1, said flow guidance means comprising a stator encompassing said impeller and having a slotted periphery effecting flow guidance slots for fuel flow to said spacing from said impeller, wherein the fuel egress means comprises a member having a continuous annular channel disposed for receiving flow from said spacing and said port means for fuel egress communicating with said channel, said body means at said ingress end comprising a disc-like member having an open central hub effecting said port means and communicating with said impeller centrally thereof.

13. A rotary electric pump as set forth in claim 1, wherein said fuel egress means of said body means comprises a member provided with an annular channel disposed to receive flow from said spacing and including an outlet conduit communicating with said channel for fuel egress from said channel to the exterior of said pump, and said member having diametrically opposed radially extending hollow bosses; and electric motor armature in said magnet having a commutator within said member, and contact brushes in said bosses for electrical connection with said commutator; said member being a molding integrally comprising said channel, said outlet conduit, and said bosses.

14. A rotary electric pump comprising an outer shell of magnetic material formed with depressions protruding thereinto and a magnet within said shell radially supported therein by said depressions so as to be spaced from said shell effecting flow passages over said magnet for the output of said pump; body means in said shell engaging said magnet to locate said magnet axially within said shell and said body means being secured within said shell; said body means being disposed at both axial ends of said magnet and having port means affording fuel ingress at one end of said shell and port means affording fuel egress at the other end of said shell, and a pump within said shell at said fuel ingress end; an electric motor armature within said magnet drivingly connected to said pump for rotation thereof and said pump having a periphery flow guidance means for directing flow over said magnet through said flow passages.

15. A rotary electric pump comprising an outer shell of magnetic material having at least two longitudinal depressions protruding therein and a magnet within said said shell radially supported therein by said depressions spaced from said shell whereby flow passages are afforded longitudinally over said magnet member intermediate said depressions; body means in said shell engaging said magnet to locate said magnet axially within said shell and said body means being secured within said shell; said body means being disposed at both axial ends of said magnet and having port means affording fuel ingress at one end of said shell and fuel egress at the other end of said shell; and a pump within said shell at said fuel ingress end; an electric motor armature within said magnet drivingly connected to said pump for rotation thereof and said pump having a periphery flow guidance means for directing flow longitudinally over said magnet through said flow passages.

16. A rotary electric pump comprising an outer shell having spaced longitudinal depressions and a cylindrical magnet therein contiguous with the inner surfaces of said depressions for radial support whereby arcuate flow recess passage means are effected longitudinally over said magnet; body member means within said outer shell engaging the ends of said magnet and being locked within said outer shell to position said magnet longitudinally therein; an armature within said magnet supported in said body member means; a stator member in said outer shell adjacent said magnet and a centrifugal impeller adjacent said stator member and having driving connection to said armature, said stator member having a peripheral collar provided with angularly spaced longitudinal slots encompassing said impeller and directing flow from said impeller over said magnet via said flow recess passage means; said body member means having an inlet communicating with said impeller and having a continuous outlet channel annularly communicating with said impeller and having a continuous outlet channel annularly communicating with said flow recess passage means and having an outlet conduit communicating with said outlet channels; rotation of said impeller by said armature effecting centrifugal flow therefrom through said slots and flow recess passage means to said annular channel and said outlet conduit.

References Cited

UNITED STATES PATENTS

| | | | |
|---|---|---|---|
| 3,418,991 | 12/1968 | Shultz et al. | 417—423 X |
| 3,211,935 | 10/1965 | Sones | 417—424 |

ROBERT M. WALKER, Primary Examiner